(No Model.)

D. B. McALICE.
INK WELL ATTACHMENT FOR INKSTANDS.

No. 425,689. Patented Apr. 15, 1890.

WITNESSES:
F. McArdle.
C. Sedgwick.

INVENTOR:
D. B. McAlice

BY
Munn & Co.
ATTORNEYS.

UNITED STATES PATENT OFFICE.

DENNIS B. McALICE, OF LINCOLN, RHODE ISLAND.

INK-WELL ATTACHMENT FOR INKSTANDS.

SPECIFICATION forming part of Letters Patent No. 425,689, dated April 15, 1890.

Application filed August 15, 1889. Serial No. 320,830. (No model.)

*To all whom it may concern:*

Be it known that I, DENNIS BERNARD MC-ALICE, of Lincoln, in the county of Providence and State of Rhode Island, have invented a new and Improved Ink-Well Attachment for Inkstands, of which the following is a full, clear, and exact description.

This invention consists in a floating dip cup or device for use in the wells of inkstands to supply the pen as it is dipped into the well with a given quantity of ink, substantially as hereinafter described, and pointed out in the claims.

Reference is to be had to the accompanying drawings, forming a part of this specification, in which similar letters of reference indicate corresponding parts in all the figures.

Figure 1:
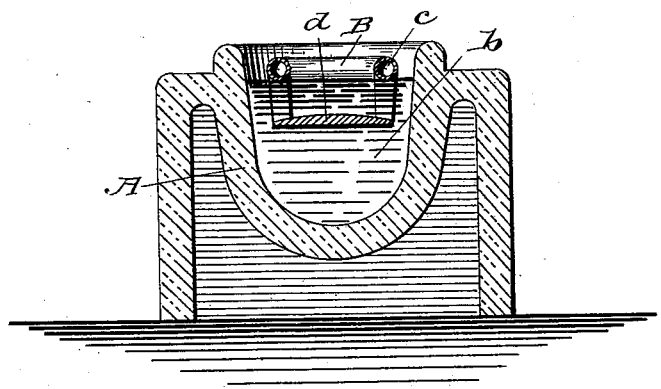
Figure 2:
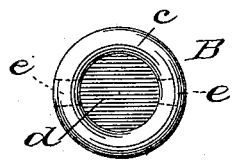
Figure 3:
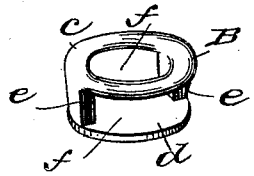
Figure 4:

Figure 1 represents a vertical section of an inkstand with my pen-dip attachment, according to one form of its construction, as floating in the ink in the well of said stand. Fig. 2 is a top view of said attachment. Fig. 3 is a view in perspective thereof, and Fig. 4 is a side elevation of the same.

A indicates the well of an ordinary or any suitable inkstand, and $b$ the ink in said well.

B indicates the pen-dip cup or device, which is dropped bottom down into the ink in the well. This dip cup or device is constructed so that while it floats in the ink in the well it will sink to a certain depth therein and have its interior in open communication with the ink in the well; but it virtually forms an independent ink-reservoir of a floating character and which is automatic in its action. Thus it is preferably made of glass and as follows—that is to say, with an annular hollow and air-tight upper rim $c$, which serves to give to the whole device its necessary buoyancy, a bottom $d$, preferably of convex form on its upper surface, and opposite side supports or connections $e\ e$, uniting the upper rim $c$ with the bottom $d$, and leaving openings $f\ f$ between said supports for the free passage of ink from the well of the inkstand to the interior of the floating dip cup or device. The side supports or connections $e\ e$ should be sufficiently long to give the proper depth of draft to the device to insure a full dip of the pen, and when taking up a supply of ink it is only necessary, in order to fill the pen, to enter the latter down within the floating dip-cup till its nib comes in contact with the bottom $d$ of said cup and never necessary to submerge the entire cup.

A perforated floating pen-dip cup thus applied to an inkstand will always gage the proper quantity of ink supplied to the pen without the user stopping to observe how much ink has been obtained or how low the ink is in the well, inasmuch as said dip-cup will always have the same relative position to the surface of the ink in the well of the stand no matter whether that be much or little, provided there be enough to float the dip-cup. Said cup will also serve to reduce the surface exposed of the ink to evaporation, and will furnish clearer ink, inasmuch as any sediment that may be inclined to settle on the bottom of the cup will be dislodged by the commotion produced by the frequent dipping of the pen in the small quantity of ink contained in the cup, and by making the upper surface of the bottom of the floating dip-cup inclining or convex in shape it will assist to shed any sediment collecting there. By supplying the pen, too, with clear ink in a regular and proper but never in a superabundant quantity much blotting or soiling in the use of the pen will be avoided and many other advantages will be obtained.

The invention is not restricted to any particular form of inkstand nor to any one class of users, but will be found alike useful in the counting-house, school, office, or elsewhere.

Having thus described my invention, what I claim as new, and desire to secure by Letters Patent, is—

1. The within-described buoyant pen-dip cup for inkstands, having openings in its sides and a bottom of convex construction on its upper surface, substantially as specified.

2. The pen-dip cup B, for inkstands, having a hollow air-tight and buoyant tubular upper portion $c$, and separated side pieces $e$, connecting the same with the bottom of the cup, essentially as described.

DENNIS B. McALICE.

Witnesses:
 MICHAEL BUCKLY,
 JOHN BLACKBURN.